May 16, 1961  C. A. JANULIS  2,984,477
LEAF SPRING CLIP MOUNTING
Filed Feb. 26, 1958
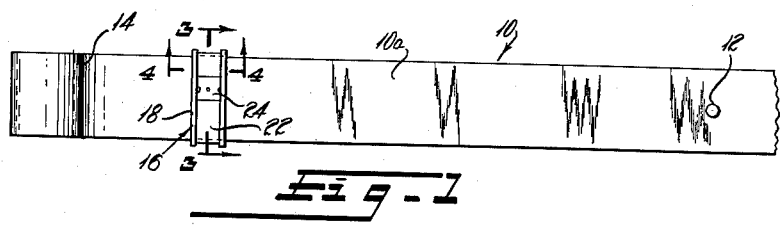
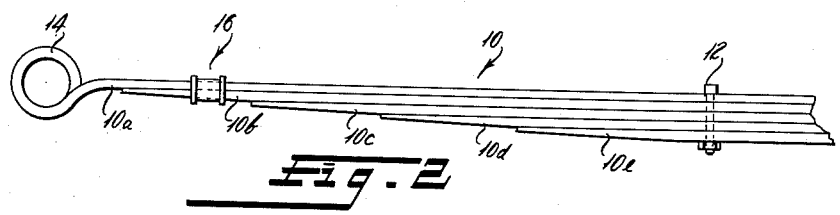
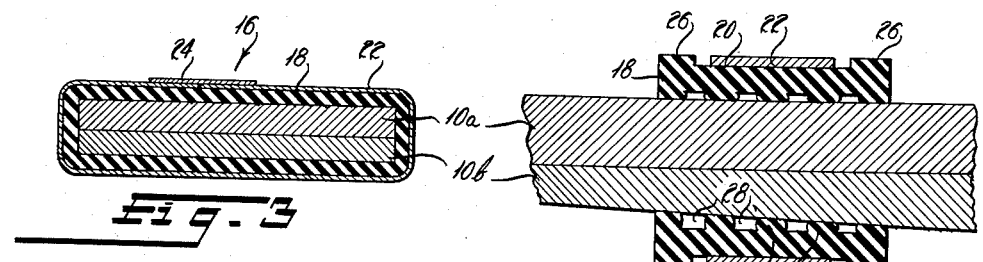
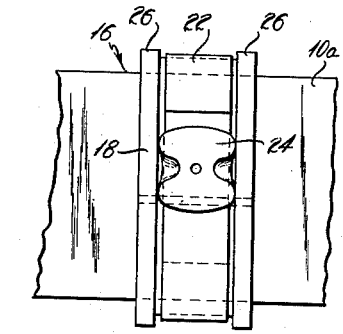
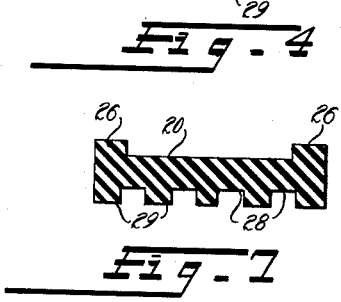
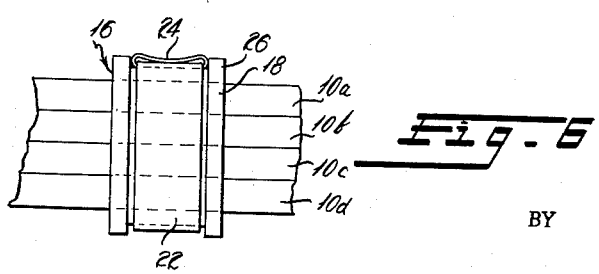
INVENTOR
CHESTER A. JANULIS
BY
Strauch, Nolan & Neale
ATTORNEYS United States Patent Office 2,984,477
Patented May 16, 1961

2,984,477
LEAF SPRING CLIP MOUNTING
Chester A. Janulis, Gary, Ind., assignor to Rockwell-Standard Corporation, a corporation of Pennsylvania
Filed Feb. 26, 1958, Ser. No. 717,770
4 Claims. (Cl. 267—53)

The above mentioned signode clip is well known, consisting of a steel strap wrapped around two or more leaves spring together and more particularly relates to an improvement in a standard type of spring clip known as the signode clip.

The above mentioned signode clip is well known, consisting of a steel strap wrapped around two or more leaves of a leaf spring assembly with a rubber cushion interposed and compressed between the strap and the leaves of the spring in such manner as to isolate the metal strap from the spring leaves and prevent squeaking and wear of metal to metal contact.

Some type of spring clip, of the signode type or others, e.g., as shown in the Geyer Patent No. 1,987,189, are a necessity on almost any multiple leaf spring application to hold the separate leaves together in longitudinal alignment during the working cycles of the spring especially at the moment of rebound. These clips must be of such nature as to allow relative longitudinal movement of adjacent spring leaves in order to realize the proper design spring rate. This relative working movement between leaves is a sliding action which, in previous installations, has required that the spring clips be securely interlocked or keyed to the spring assembly to prevent the clips from working loose and gradually shifting to the thinner ends of the spring. The relative sliding and flexing between spring leaves during working action creates still another problem concerning the spring clips: that of wear between the cooperative surfaces of clip components and spring leaves.

In attempting to satisfactorily overcome those disadvantageous aspects, several proposals have been advanced and are practiced. To minimize wear, and accordingly prevent noise, it has been and still is a most widely used practice to insert a resilient material, such as rubber, with a high friction coefficient between the spring clip components and other relatively moving parts of the spring assembly.

All of the previously known proposals utilize some method, such as notching the clip to a leaf or riveting the lower leaf and clip together to prevent the clip from slipping away from its desired position, but those methods require extra time and steps in assembly and hence are not compatible with the time rate and economy of manufacturing and assembling procedures desired today.

The introduction of the signode clip seemed to be the best achievement in the direction of a simplified leaf spring clip, however, experience has proven that even those clips with the compressed rubber channel have a tendency to slip away from their desired seats. However, the simplified metal strap and rubber channel of the signode clip are desirable features with which the novel non-slip structure of the present invention has been incorporated to constitute an advance in this art which has been greatly desired and is proving to be highly satisfactory and acceptable.

Accordingly, a primary object of the present invention resides in the provision of a novel resilient gripper cushion for an improved leaf spring clip which is entirely slip proof, without requiring a positive interlock between the spring clip and a leaf of the spring assembly.

Another objects resides in providing a novel resilient serrated cushion channel for a signode type leaf spring clip to prevent creepage of the clip longitudinally along the spring during the deflection cycles of the spring.

A further object resides in the provision of a novel resilient channel of grooved cross section for cooperative application with a steel strap type leaf spring clip, the grooves providing sufficient room for the rubber to expand under compression by application of the steel strap and thereby reducing frequently encountreed strap breakage.

Further novel features and other objects of this invention will become apparent from the following detailed description, discussion and the appended claims taken in conjunction with the accompanying drawings showing a preferred structure and embodiment, in which:

Figure 1 is a top plan view of one half of a vehicle leaf spring with a steel strap type spring clip, in accord with this invention, properly attached near its ends;

Figure 2 is a side elevation of that portion of the leaf spring shown in Figure 1;

Figure 3 is an enlarged transverse section through the spring clip assembly, taken on line 3—3 of Figure 1;

Figure 4 is a longitudinal section through the leaf spring and spring clip assembly, taken on line 4—4 of Figure 1, enlarged more than Figure 3 to illustrate the inner grooves and bulged expansion of the lands of the compressed resilient channel member;

Figure 5 is an enlarged top plan view of the steel strap, spring clip assembly attached to a leaf spring;

Figure 6 is a side view of the detail shown to Figure 5 and clearly illustrates the spring clip applied around four of the leaves; and Figure 7 is an enlarged detail section through the novel resilient channel member showing the inner groove shapes prior to the channel member being compressed on a leaf spring.

The same reference numerals refer to similar parts throughout the description.

Having reference now to Figures 1 and 2, the exemplary, basically conventional vehicle leaf spring 10 includes a plurality of leaves indicated at 10a, 10b, 10c, 10d and 10e, the leaves progressively diminishing in length from their ends towards the spring center, at which position all leaves are secured together by a center bolt 12. The longest top leaf 10a is provided with integral eyes 14 rolled in each of its ends (only one eye being shown) enabling the leaf spring 10 to be attached to the underside of a vehicle frame (not shown) in the well-known manner. The leaf spring illustration is typical and is representative of such springs used in front as well as rear vehicle suspension systems. Near the ends of leaf spring 10, a spring clip 16 is attached around the two upper leaves 10a and 10b.

Although, in the illustrated exemplary embodiment, only one clip 16 is shown attached near one end of leaf spring 10 (and another, not shown, is at the opposite end), it will be obvious that the number of clips which can be used is not limited to two, since there may be as many as is permitted by the type and application of the leaf spring. Figure 6, for example, illustrates a clip 16 attached farther toward the center of the leaf spring 10 and fastened around four leaves instead of two.

Shown in Figures 3–6 is a resilient channel member 18 made of rubber or the like which has been placed over the desired number of leaves, in this instance two leaves, and compressed in clip 16. The band-like channel member 18, is made in the form of a strip of resilient material and wrapped around the appropriate number of spring leaves with the strip ends essentially in abutment, or in some instance it could be made as a closed ring. Note that a closed ring or band form of channel member 18 would be extremely difficult to slip over a large spring eye as illustrated in Figure 2.

Circumscribing the outer periphery of resilient member 18 is a flat bottom groove 20 of such width and depth as to receive a steel strap 22 preferably made of stainless steel. The strap 22 is mechanically wound around the resilient channel member 18 by a signode clipping machine (not shown) in a manner to compress the resilient member. The ends of steel strap 22 are tightly fastened together by a stainless steel clip seal 24 disposed on the tension side of the spring and clinched to the strap by the same signode machine. The standing side edges 26 of the member 18, which form the side walls of groove 20, prevent the steel strap 22 from slipping off the resilient channel.

The inner peripheral surface of the resilient channel member 18 is provided with a number of circumferential grooves 28 forming lands 29 which provide a plurality of gripping edges to engage the spring leaf surfaces with sufficient friction to prevent any slippage of the clip 16 longitudinally of the spring leaves during spring deflections. Although the groove bottoms can be squared, as shown, or rounded, it is preferable that the lands 29 on each side of grooves 28 have squared or sharp edges for best gripping action against slipping along the spring leaf surfaces.

The number and the width and depth of grooves 28 will be established by the size of the resilient channel member used, but should be such as to provide enough room for the resilient material of the lands 29 to bulge under compression, as shown in Figure 4, and be subject to a resilient flow-like deformation during spring articulation. The grooves 28 provide another advantageous aspect of this invention in that they serve to considerably reduce the breakage of the steel strap which occurs frequently in signode clips using the conventional flat rubber collar.

As is clearly apparent from the foregoing description, the present invention provides a simple and inexpensive means to prevent slippage of a spring alignment and rebound clip, eliminating the necessity of incorporating other clip holding means such as leaf interlocks by notching, riveting, bolting, etc. This invention offers a wide range of applications and is not limited to special size springs. The assembling of this spring clip can be accomplished using the conventional signode machines and method as already widely practiced through the industry.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a multiple leaf spring assembly, a spring clip encircling and supported entirely upon said assembly consisting essentially of a metal band surrounding a plurality of the spring leaves at a desired location along the length of the assembly and an annular resilient liner member having a transverse series of annular lands and grooves on its inner peripheral surface compressed between the band and the spring leaves sufficiently to prevent creepage of the spring clip longitudinally along the leaf spring asembly during deflection cycles of the spring.

2. The leaf spring combination as defined in claim 1 wherein said lands are sharp edged along their sides for optimum engagement with the leaf spring and the grooves provide room for the resilient material in said lands to expand under compression by said metal band.

3. In a leaf spring assembly of the type wherein a stack of flat flexible metal spring leaves are relatively longitudinally slidable at their outer ends during flexing of the spring assembly under load, a clip surrounding the leaves at and outer end portion and comprising an annular body of resilient friction material encircled by a circumferentially tight flexible metal band, said body having a plurality of alternate annular lands and grooves extending generally parallel to said band and said lands being compressed into tight frictional engagement with the adjacent spring leaf surfaces to prevent said clip from being displaced longitudinally in the assembly.

4. In the assembly defined in claim 3, said resilient body being of substantially uniform cross-section throughout.

References Cited in the file of this patent

UNITED STATES PATENTS

| | | |
|---|---|---|
| 1,781,631 | Fageol | Nov. 11, 1930 |
| 2,006,644 | Lundelius et al. | July 2, 1935 |
| 2,227,300 | Dow | Dec. 31, 1940 |
| 2,297,483 | Kuhne | Sept. 29, 1942 |
| 2,920,884 | Rowland et al. | Jan. 12, 1960 |

UNITED STATES PATENT OFFICE
CERTIFICATION OF CORRECTION

Patent No. 2,984,477                      May 16, 1961

Chester A. Janulis

It is hereby certified that error appears in the above numbered patent requiring correction and that the said Letters Patent should read as corrected below.

Column 1, lines 15 and 16, for "The above mentioned signode clip is well known, consisting of a steel strap wrapped around two or more leaves" read -- This invention relates to an improved spring clip mounting as employed to hold the leaves of a multiple leaf --; column 2, line 4, for "objects" read -- object --; line 13, for "encountreed" read -- encountered --; same column 2, line 22, for "ends" read -- end --; column 4, lines 30 and 31, for "flexiing" read -- flexing --.

Signed and sealed this 24th day of October 1961.

(SEAL)
Attest:

ERNEST W. SWIDER
Attesting Officer

DAVID L. LADD
Commissioner of Patents